UNITED STATES PATENT OFFICE.

JOHN ENEQUIST, OF BROOKLYN, NEW YORK.

PROCESS OF MAKING POROUS SULFATE OF ALUMINA.

SPECIFICATION forming part of Letters Patent No. 520,416, dated May 29, 1894.

Application filed February 20, 1894. Serial No. 500,924. (No specimens.)

*To all whom it may concern:*

Be it known that I, JOHN ENEQUIST, a subject of the King of Sweden and Norway, residing in Brooklyn, in the county of Kings and State of New York, have invented certain new and useful Improvements in the Manufacture of Sulfate of Alumina; and I do hereby declare that the following is a full, clear, and exact description of the invention, which will enable others skilled in the art to which it appertains to make and use the same.

I produce the sulfate of alumina in the usual well known way by treating oxid of aluminum either in a pure state or as contained in various kinds of clay, with sulfuric acid and evaporating the clear solution until it holds from fourteen to seventeen per cent. of oxid of aluminum, and then allowing it to solidify on a suitable surface. This method generally produces an article of such dense and impervious structure that it is necessary to break and grind it to make it readily soluble in water.

To overcome this difficulty and produce a light and porous article, not requiring expensive and troublesome grinding, is the object of my invention. The same thing has heretofore been done by the aid of bi-carbonate of soda mixed in among the sulfate of alumina, as it solidified. By the action of sulfuric acid in the sulfate of alumina on the bi-carbonate of soda carbonic acid is evolved, which rising through the mass is arrested by the latter hardening and causing a porous condition. The more evenly the gas bubbles are divided in the mass, the quicker and more rapid is the solution in the water. An objection to the old method with bi-carbonate of soda is that it introduces sulfate of soda, which is a useless addition.

I avoid the introduction of any inert substance and produce an article which I think is also more porous, and consequently more easily dissolved. To accomplish this I allow the hot concentrated solution of sulfate of alumina, when ready to be run off and solidify upon cooling, to flow from the evaporating tanks onto a floor or flat surface composed of zinc- or aluminum-plates suitably joined to each other and to the foundations. The hot sulfate of alumina solution when striking the surface of the metal causes a lively evolution of hydrogen gas, which rising through the solidifying mass, distributes itself all through the same. This gas is arrested before it has a chance to escape by the mass hardening and the result is a "cake" of a very uniform porosity and great lightness. In this process a small amount of zinc or aluminum is taken up by the sulfuric acid, forming sulfate of zinc or alumina respectively. The sulfate of alumina is of course no objection. Neither can the sulfate of zinc be said to constitute an objection to the "cake," as even sulfate of zinc has its value as a sizing agent. I believe that the article thus produced is more easily soluble in water than any other so far made. The necessity for grinding is entirely obviated, as the article dissolves almost as fast as thrown into the water.

I do not claim the use of zinc, as a reducing agent for the iron, if any is contained in the sulfate of alumina, as I am aware that that process is already patented, nor is it in any sense my object to reduce the iron but only to produce an evolution of gas among the solidifying mass. Nor could the iron be thus reduced, as the time elapsing before the liquid is solidified is very short and very little zinc is taken up. Where the reduction of the iron is desired, long continued boiling with zinc is necessary, and the resulting product contains from two to three per cent. of zinc, while mine holds less than five one hundredths of one per cent.

What I therefore claim, and wish to secure by Letters Patent, is—

The process of making porous or spongy sulfate of alumina, which consists in pouring a hot concentrated solution of sulfate of alumina onto a surface of a metal, which will thereby evolve hydrogen, such as zinc or aluminum, allowing the sulfate of alumina to cool and solidify while in contact with such metallic surface, whereby the hydrogen given off will pass through the material and make it porous as described.

JOHN ENEQUIST.

Witnesses:
CHARLES LA FORGE,
E. AQUEESSENT.